May 29, 1951 W. W. COWGILL 2,554,662
PROCESS OF GLOSSING PAPER
Filed Aug. 16, 1947
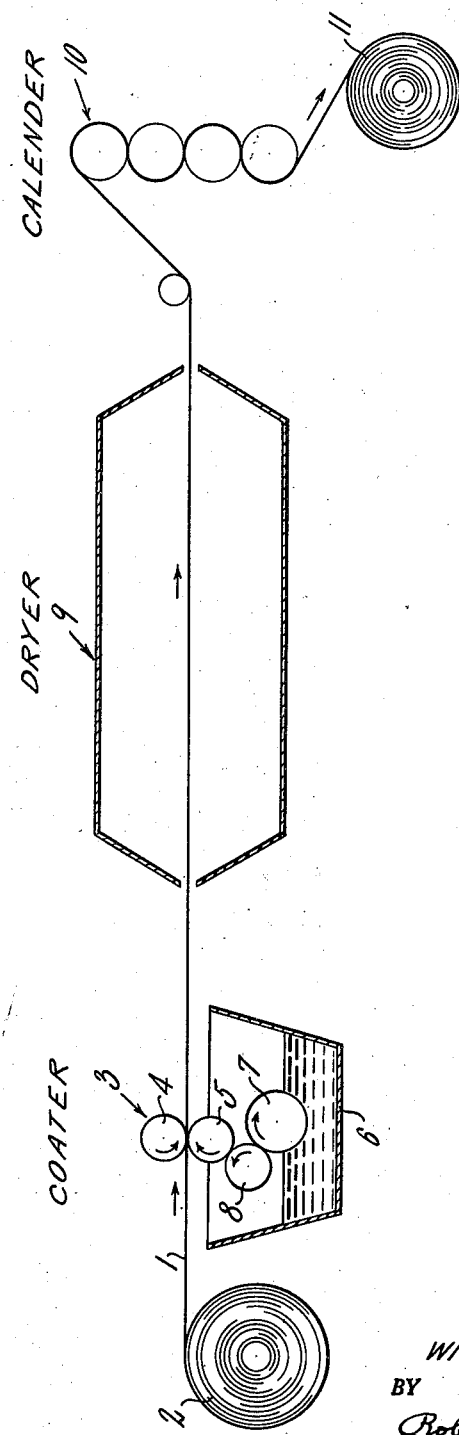
INVENTOR.
WILLIAM W. COWGILL
BY
Robert J. Patterson
ATTORNEY Patented May 29, 1951

2,554,662

UNITED STATES PATENT OFFICE 2,554,662

PROCESS OF GLOSSING PAPER

William W. Cowgill, Fairfield, Conn., assignor to United States Rubber Company, New York, N. Y., a corporation of New Jersey Application August 16, 1947, Serial No. 769,046

2 Claims. (Cl. 117—65)

This invention relates to the coating of paper and more particularly to a method of providing paper with a thin continuous coating of an amorphous thermoplastic polymer. In one aspect which is particularly important commercially the invention relates to the glossing of paper with resinous thermoplastic polymeric material which, when applied in the manner herein described, gives a paper product having a very high gloss finish that has good flexibility, low odor or flavor, excellent adhesion to the base paper material, good appearance, reduced water vapor transmission, enhanced oil- and grease-resistance and good abrasion- and scuff-resistance.

At the present time there are two principal methods of glossing paper with thin continuous coatings of amorphous polymeric materials such as resinous thermoplastic polymers. One of these methods is to preform a foil of the resinous material and to then lay a sheet of the foil over the paper and apply heat and pressure to cause it to adhere to the paper and give it the desired high gloss. The principal objections to this method are the great expense, inadaptability to continuous high speed manufacturing processes, and the marked tendency of the applied foil layer to separate from the paper base upon handling and use. Another method of coating paper with amorphous thermoplastic materials such as resins has been to apply a solution of the resin in a volatile organic solvent to the paper base and to then remove the solvent by drying. If a higher gloss is desired this is sometimes obtained by heating the thermoplastic material above its melting point after it is dried on and allowing it to flow into a partially smooth coating after which it is cooled below the solidification point. This method is not very satisfactory because of the great expense of the organic solvent, the fire hazard, the practical necessity for using solvent recovery systems in conjunction with the coating equipment and the tendency to give a film which does not have the desired high gloss. In addition there is a tendency with the latter type of method for residual solvent to remain in the coating and impart thereto an undesirable odor or flavor. Furthermore there is a marked tendency for the organic resinous solution to penetrate into the paper to an objectionable extent.

The principal object of the present invention is to provide a method of coating paper with amorphous thermoplastic polymers which method overcomes the foregoing objections. Another object is to provide a method of glossing paper with amorphous thermoplastic polymers, especially resinous polymers. Another object is to provide a method of the foregoing type which is adapted to high speed continuous production. Another object is to provide a method whereby paper can be glossed with such amorphous polymers which method is sufficiently cheap that the product can be used widely wherever its desirable properties of good appearance, particularly high gloss, reduced water vapor transmission, etc. make its use attractive.

The accompanying drawing portrays diagrammatically one arrangement of equipment which can conveniently be employed for practicing the present invention.

I have discovered that paper can be glossed in a highly improved manner by applying on the surface of the paper a coating of an aqueous dispersion of an amorphous thermoplastic polymer having a second order transition temperature between 40° C. and 125° C., drying the thus coated paper at a temperature which is from 20° C. to 60° C. higher than the second order transition temperature of the polymer employed, pressing the dried coated surface of the paper against a heated surface at a temperature which is from 40° C. to 80° C. higher than the second order transition temperature whereby the polymer on the surface of the paper is converted to a thin continuous strongly adherent highly glossed coating, and stripping the hot glossed product at this temperature from the heated surface.

In the preferred practice of my invention, I use an amorphous thermoplastic polymer having a second order transition temperature between 55° C. and 100° C., I employ in the drying step a temperature which is from 30° C. to 50° C. higher than the second order transition temperature of the polymer and I use in the glossing step a temperature which is from 50° C. to 70° C. above the second order transition temperature of the polymer. The glossing temperature can be reduced as the pressure is increased but still is within the broad range of 40–80° C. above the second order transition temperature. However, the variation in temperature over a pressure range of 200 to 1500 pounds per square inch in the glossing step will only amount to approximately 10° C. so that it is still within the range of glossing temperature given.

Generally speaking, optimum results are obtained in the practice of my invention by using in the drying step a temperature which is 40° C. above the second order transition temperature of the polymer and in the glossing step a temperature of 60° C. above the second order transition temperature of the polymer. The second order transition temperature of an amorphous thermoplastic polymer is best determined by measuring density thereof as a function of temperature. An abrupt change in the slope of the density-vs.-temperature curve defines a second order transition point. The temperature at which this occurs is called the second order transition temperature, conveniently designated as $T_2$. Amorphous thermoplastic polymeric materials display this phenomenon of going through the second order transition at which time they are believed to change from a so-called two-dimensional liquid to a three-dimensional liquid. At this point they begin to flow more readily and as the temperature is raised the viscosity goes down and the tack increases. My invention is based upon the discovery that by using drying and glossing temperatures within critical ranges above the second order transition temperature, unusually good results are obtained, whereas if temperatures outside these critical limits are employed, unsatisfactory results are obtained.

Any amorphous thermoplastic polymer (which term as used herein includes copolymers) having a second order transition temperature of from 40° to 125° C., and preferably of from 55° to 100° C., may be used in practising the present invention. If the second order transition temperature of the polymer is too low, difficulty with blocking of the product is encountered. On the other hand, if the second order transition temperature is too high, there is serious danger of injuring the product during the glossing step because of the high temperature employed in that step if the second order transition temperature is extremely high. I usually use those synthetic resinous polymers which may be characterized as normally hard and normally inelastic resins. Since the most important commercial application of my invention will be in the glossing of paper, I prefer to use resinous polymers because they impart a high gloss to the coated paper when used in accordance with the preferred method of my invention wherein a highly polished, usually metallic, surface is used in the pressing step.

Examples of resinous polymers which may be employed in the practice of my invention are polystyrene, polymerized ethylene, polyvinyl chloride, polyvinyl alcohol, vinyl chloride-vinyl acetate copolymers, polymerized methyl methacrylate, or any other synthetic resinous polymer which exhibits the desired hardness at room temperature. The material used preferably has the properties of good abrasion and scuff resistance, high resistance to the transmission of water vapor, low odor or flavor, good flexibility at both normal and low temperatures, high resistance to oil and grease, good adhesion to paper, low combustibility, good chemical resistance and adequate resistance to sunshine. The material should not exhibit blocking (which is the solidification of a plurality of the coated sheets into a block at ordinary or moderately elevated temperatures). It is often desirable to use resins which exhibit the property of heat-sealing both to themselves and to uncoated paper since this allows the coated product of my invention to be heat-sealed either to itself or to uncoated paper.

I have obtained very good results with normally hard, normally inelastic resinous thermoplastic copolymers of styrene and at least one unsaturated copolymerizable material selected from the group consisting of aliphatic conjugated dienes, especially butadiene-1,3, and acrylic nitriles having the formula $$CH_2=C-CN$$
$$|$$
$$R$$

where R is hydrogen or alkyl (especially methyl, ethyl or propyl), particularly acrylonitrile, wherein the relative proportions of combined styrene and said material selected from said group range between 65 and 97 per cent by weight of styrene based on the weight of styrene and said material and correspondingly between 3 and 35 per cent by weight of said material selected from said group. Typical examples of the latter type of resin are copolymers of from 80 to 97 per cent by weight of styrene and correspondingly from 20 to 3 per cent by weight of butadiene-1,3 and copolymers of from 65 to 80 per cent by weight of styrene and correspondingly from 35 to 20 per cent by weight of acrylonitrile; these two types of resins have second order transition temperatures of the order of from 65 to 85° C. and from 90 to 120° C., respectively; the aqueous dispersions of these two types of resins may be dried at temperatures of from 105 to 125° C. and from 130 to 160° C. respectively, and the pressing step may be conducted at temperatures of from 125 to 155° C. and from 140 to 180° C. respectively. Instead of copolymers of styrene and only one material selected from said group, I may use ternary copolymers of styrene and both a diene and an acrylic nitrile selected from said group, such as a ternary copolymer of styrene, butadiene and acrylonitrile, the proportion of styrene being from 65 to 97 per cent and the sum of butadiene and acrylonitrile ranging from 3 to 35 per cent.

I have also obtained very excellent results using a resinous copolymer containing from 65 to 80 per cent of combined acrylonitrile and correspondingly from 20 to 35 per cent of combined isobutylene, an example of such a resin being a copolymer consisting of 70 per cent combined acrylonitrile and 30 per cent combined isobutylene and having a second order transition temperature of about 76° C.

The amorphous polymeric material is employed in the form of an aqueous dispersion which may be prepared in any suitable manner. For example, the preformed polymer such as resin may be dispersed in water in known manner or the resin can be formed as an aqueous dispersion by the emulsion polymerization of the monomeric material. The dispersion may contain any of the known emulsifying and dispersing agents. For this purpose any suitable emulsifier may be used. A dispersion which contains no emulsifier or similar surface active agent can be employed with perfectly satisfactory results in my invention but since it is difficult to produce a dispersion having the desired stability without an emulsifier, it is desirable to use one especially where a considerable period of time elapses between preparation of the dispersion and application thereof to the paper. It may have any suitable concentration. Generally the proportion of dispersed resin or other amorphous polymer in the aqueous dispersion will range from 25 to 45 per cent by weight and preferably from 30 to 40 per cent by weight. In general the higher concentrations are preferred because they present less water to be removed in the drying step and because they make possible the application of greater amounts of solids per unit area of the paper. However the film produced by the present invention is very thin (approximately 0.0001" thick) and the higher concentrates are difficult to spread on in the thin layer desired; therefore I prefer to use a concentration of between 30% and 40% of dispersed resin. Concentrations above 40% produce a thicker film but increase the cost and are apt to cause difficulties with cracking or lack of flexibility, discoloration, etc. In addition to the dispersed resin, or other amorphous polymer, the aqueous dispersion may embody other materials such as dyes, pigments, fillers, plasticizers, etc. While a plasticizer for the resin or the like may be used, it is not essential and good results are obtained without it.

The amount of the dispersion applied to the paper may conveniently be such that between 6 and 12 pounds of amorphous polymer (on a dry basis) are applied per 1,000 sheets of paper 25" x 36". This rate of application corresponds to from 0.96 to 1.92 pounds per 1,000 square feet of paper. The amount of dispersion applied should be such that when the wet paper is dried and thereafter pressed against a heated surface in the manner and under the conditions disclosed herein, a thin continuous coating, preferably having a high gloss, is obtained. The amount of polymer applied per square foot may vary depending upon the type of paper since a denser paper with a higher finish will give a better coating with less absorption and therefore less amorphous material than a more porous paper with a not too highly polished surface. The amount of solids applied will also depend upon the amount of coating and the gloss which the paper manufacturer or coater desires.

The thickness of the film applied to the paper in accordance with my invention may vary widely but preferably is in the neighborhood of one ten thousandth of an inch (0.0001"), say from 0.00005" to 0.0002" inch. A film of such thickness gives the desired protection, gloss and other characteristics desired in the coated paper and yet may be applied at low cost and gives no difficulty with cracking or lack of flexibility even though no plasticizer is present.

Any suitable method of effecting coating of the paper with the aqueous dispersion of the amorphous thermoplastic polymer may be employed. The ordinary standard commercial equipment used for coating paper may be used. The coating can be effected by transfer roll, dipping, spreading or with any of the commercial coating methods now in use.

After the paper is coated, the aqueous dispersion thereupon is dried to effect substantially complete removal of the water therefrom. Ordinarily it is dried to approximately 3 per cent moisture content or less by passing the wet coated paper through a heated tunnel, oven or other types of drying equipment such as drying cylinders or drying cans of paper machines, etc.

In this drying operation it is necessary to use a temperature between 20° C. and 60° C., and preferable to use a temperature between 30° C. and 50° C., higher than the second order transition temperature of the polymer employed. If the aqueous dispersion is dried at a temperature less than 20° C. above its $T_2$ point, the dispersion dries powdered, the resin does not become tacky and is easily dusted or rubbed off the surface of the paper and does not stick to the fiber. However if the aqueous polymer dispersion is dried at a temperature of between 20° C. and 60° C. above its $T_2$ point, a preferred range being between 30 and 50° C. thereabove and the optimum drying temperature being 40° C. thereabove, the polymeric material becomes tacky and in small particles sticks to the surface of the paper and cannot be dusted, rubbed, or shaken off.

If, however, the wet coated paper is dried at temperatures of more than 60° C. above the $T_2$ point, the polymer becomes too fluid and is absorbed by the paper so that none, or only a very small amount, of the material is left on the surface for conversion to the desired thin continuous film, in the subsequent glossing step. This absorption by the paper starts at the $T_2$ plus 60° C. point and increases rapidly as the temperature is raised further.

After drying the aqueous dispersion on the paper, the paper then enters the third step of my process. In this step the dried coated surface is pressed against a heated surface to obtain the desired thin, highly glossed, continuous coating. This step effects glossing of the polymers on the surface of the paper to the desired thin continuous film tenaciously adherent thereto. This glossing step can be done with any standard equipment such as conventional highly polished calender stacks or in presses between polished metallic platens. The metallic rolls of the calender stack or the metallic platens may be given an extremely high polish by chromium plating and may be heated in any suitable manner, for example by steam or electricity. The use of a continuous calender stack is preferred over the use of platen presses when a continuous glossing step is desired.

The time of exposure of the dried coated paper in the glossing step can be very short depending upon the temperature and pressure employed. I have found that it is necessary to use a temperature which is from 40° C. to 80° C. higher than the $T_2$ point of the polymer, a preferred range being from 50 to 70° C. thereabove and the optimum temperature being 60° C. thereabove. The pressure used in the glossing step may vary widely. Very satisfactory results have been obtained using any of the present commercial pressures, such as that used on the usual stack of calender rolls, which may range from 200 to 1,500 pounds per square inch in the nips. As stated above, the temperature used in the glossing step can be reduced as the pressure used therein is increased.

Good results can be obtained in the glossing operation only if the paper has been properly coated and dried at the correct temperature as described above. If the precautions given above have been followed, a continuous coating, which has a high gloss if highly polished metallic surfaces are used in the pressing step, is obtained with a very small amount of material that is entirely satisfactory for commercial use. If, however, the coated paper has been dried at too low a temperature, a continuous surface is not obtainable in the glossing step. In fact depending on how much below the proper temperature the paper was dried, the surface of the product becomes poorer and poorer with merely streaks or patches of gloss here and there.

If the paper has been dried at temperatures above those indicated above and the amorphous polymers consequently have become too fluid and have been absorbed unduly by the paper in the drying step, no gloss is obtained in the pressing step because there will be little or no polymer left on the surface to gloss. Furthermore the paper in which the polymer has been absorbed in the drying step tends to stick to the glossing rolls or platens and cannot be stripped.

By using glossing temperatures in accordance with the foregoing teachings, perfect glossing of the resin is obtained and the hot glossed paper can be readily stripped from the heated pressing surface without sticking. Temperatures below the glossing range given do not soften the polymer sufficiently with the result that it does not gloss. Glossing temperatures above the range given cause the polymer to be absorbed by the paper in the glossing step with the result that the paper sticks to the calender rolls or to the surface of the platens against which the paper is being pressed. If the drying and glossing temperatures are correctly selected in accordance with the foregoing teachings, no difficulty with sticking of the coated paper to the heated surface in the glossing step is encountered. This enables the hot finished paper to be readily continuously stripped from the heated pressing surface.

The process of my invention may be carried out continuously or batchwise. The individual steps may likewise be carried out in a continuous or in a batchwise manner.

The paper which is coated or glossed in accordance with my invention may be either printed or unprinted.

The temperature used in the glossing step of my invention is usually substantially higher than that used in the drying temperature. In fact I generally gloss at a temperature of from 15 to 25° C., preferably 20° C., above the drying temperature.

The following table lists a number of polymeric materials which are typical of those which may be used in accordance with my invention, together with $T_2$ points and optimum drying and glossing temperatures for each.

| | $T_2$, °C. | Drying Temperature, °C. | Glossing Temperature, °C. |
|---|---|---|---|
| Copolymer of 85% styrene and 15% butadiene | 75 | 115 | 135 |
| Copolymer of 90% styrene and 10% butadiene | 80 | 120 | 140 |
| Copolymer of 70% styrene and 30% acrylonitrile | 100 | 140 | 160 |
| Copolymer of 65% styrene and 35% acrylonitrile | 110 | 150 | 170 |
| Polyvinyl chloride | 76.5 | 116.5 | 136.5 |
| Polymerized methyl methacrylate | 54 | 94 | 114 |
| Copolymer of 70% acrylonitrile and 30% isobutylene | 76 | 116 | 136 |
| Polystyrene | 82 | 122 | 142 |
| Polyethylene | 82 | 122 | 142 |

When each of the amorphous polymers indicated in the foregoing table was applied in the form of an aqueous dispersion to paper in the manner described above, the wet coated paper dried at the temperature indicated in the table, and the dried coated paper pressed against a highly polished metallic surface at the glossing temperature indicated in the table, very excellent glossed paper resulted.

As a further example of the use of the process of my invention, a normally hard, normally inelastic resinous copolymer of 85% styrene and 15% butadiene, having a $T_2$ point of 75° C., was applied in aqueous dispersion to smooth surface calendered paper in a proportion of about 1.5 pounds of resin per 1,000 square feet of paper. After completing the coating the paper was dried immediately at a temperature of 115° C. which required about 35 seconds. The coated and dried paper was then glossed by putting it through a standard commercial calender stack with a pressure of approximately 700 pounds per square inch in the nips and with a surface temperature of 135° C. The glossed paper was stripped hot from the heated calender roll. The resulting coated paper had an excellent gloss.

As another example, I used a resinous copolymer of 65% styrene and 35% acrylonitrile having a $T_2$ temperature of 110° C. I took smooth surface calendered paper and coated it in the same manner as described in the preceding paragraph, dried it at a temperature of 150° C. and subsequently glossed it on a calender stack with pressure of 700 pounds per square inch in the nips with a surface temperature of 170° C.

In the accompanying drawing, paper 1 is withdrawn continuously from a supply roll 2 and passed through coating device 3 which may be of any suitable type and which may coat only one side or both sides of the paper 1 with the aqueous dispersion of the resin. As illustrated, coater 3 may embody an upper roll 4 and a lower roll 5 between which the web being coated passes, rolls 4 and 5 engaging the paper with suitable pressure. A reservoir 6 contains the coating bath. Roll 7 dips below the level of the aqueous dispersion in tank 6 and coats a second roll 8 which in turn coats the third roll 5 which in turn coats the paper. The use of the system shown effects application of a thin even film of the coating mixture to the lower side of the paper web 1 and enables ready control of the amount applied in a manner well known to the art.

The coated paper then passes through drying oven or tunnel 9 which effects removal of substantially all of the water under conditions of temperature carefully controlled in accordance with the above teachings.

The dried paper web then passes through heated calender 10 which usually comprises the conventional highly polished metallic rolls which calender the coated paper and convert the polymer coating on the surface of the paper to a thin continuous glossy coating. The temperature of this operation is carefully controlled in accordance with the foregoing description in order to effect the desired result. The hot glossed paper is stripped hot from the last roll which its coated surface contacts in the calender stack.

Instead of highly polished rolls, calender 10 may comprise rolls which have an etched surface to give to the paper coating a satiny finish instead of a highly glossed finish. Still further, the rolls of the calender may have an engraved surface, such as a surface having ruled thereon a pattern of closely spaced lines. Ordinarily however I use smooth highly polished rolls in order to obtain a smooth highly glossed coating.

An even-speed calendering operation is employed in the glossing step of my invention, whereby the coated paper passes between the rolls at the same linear speed as the surface of the rolls.

The calendered paper may then be wound up on a product roll 11. It may be wound up immediately after leaving the calender 10 since if the teachings of my invention have been followed there is no problem of sticking or "blocking" of the hot finished product.

While a continuous process has been illustrated in the drawing, it will be understood that a batch or discontinuous process may be employed. For example the dried coated paper issuing from dryer 9 may be rolled up and subsequently passed through glossing unit 10. Likewise instead of a continuous glossing unit I may, though much less preferably, employ a press having a heated highly polished platen which is pressed against the coated surface of the paper and accomplishes the production of a thin continuous coating of the polymer.

From the foregoing description it will be seen that the present invention provides a very satisfactory method of glossing paper with thin continuous tenaciously adherent films of amorphous thermoplastic polymers. It will also be seen that the present invention provides a simple, certain and economical method of glossing paper with resinous thermoplastic polymers. The process of my invention furnishes a completely satisfactory solution to the problem of gloss-coating paper with resinous polymers or the like and accomplishes glossing by pressing the coated paper against a heated highly polished surface, a thing which has not been done heretofore so far as I am aware. The process of my invention is especially satisfactory because stripping of the hot coated paper from the heated glossing surface is accomplished without sticking since the adhesion between the surface coating and the heated polished metallic surface is lower than that between the coating and the paper and is so low that the paper does not tear as it is stripped. An especially advantageous feature is that the product is stripped from the hot glossing surface, it being wholly unnecessary (and in fact undesirable since it makes high speed production impractical) to cool the glossing surface before removing the coated paper therefrom. The process yields a product which is cheap enough to be used widely wherever its properties of resistance to moisture vapor transmission, high gloss, heat sealing capabilities, attractive appearance and other qualities render it highly desirable. The product is particularly advantageous because the coating does not display any tendency to separate from the paper base as is the case with present glossed papers made by laminating transparent foil on paper. Many other advantages of my invention will be apparent to those skilled in the art.

The material of the heated surface against which the coated surface of the paper is pressed to effect the glossing is almost invariably highly polished metal i. e. metal having a mirror-like finish, for example a chromium plated steel roll or the like. However, it could conceivably be of other suitable material having sufficient hardness and other qualities rendering it suitable for such use. One of the most important requirements of the material is that the resin-coated surface of the paper must not stick to it.

Having thus described my invention, what I claim and desire to protect by Letters Patent is:

1. A continuous process of glossing paper with a thermoplastic resinous polymeric material selected from the group consisting of polystyrene, polyethylene, polyvinyl chloride, polyvinyl alcohol, copolymers of vinyl chloride and vinyl acetate, polymerized methyl methacrylate, resinous copolymers of from 80 to 97 per cent by weight of styrene and correspondingly from 20 to 3 per cent by weight of butadiene, resinous copolymers of from 65 to 80 per cent by weight of styrene and correspondingly from 35 to 20 per cent by weight of acrylonitrile, and copolymers of from 65 to 80 per cent acrylonitrile and correspondingly from 35 to 20 per cent of isobutylene and having a second order transition temperature between 40° C. and 125° C. which comprises applying a coating of an aqueous dispersion of said resinous material on the surface of the paper, drying the coated paper at a temperature which is from 20° C. to 60° C. higher than the second order transition temperature of said resinous material and thereby removing the water from the coating and causing said resinous material to adhere to the surface of the paper in the form of small particles constituting a discontinuous film in preparation for the subsequent glossing step, continuously glossing the coating of resinous material on the surface of the paper by subjecting the dried coated paper to a continuous even-speed calendering operation in which the coated surface of the paper is pressed continuously against a heated highly polished roll surface which is at a temperature from 40° C. to 80° C. higher than the second order transition temperature of said resinous material and thereby converting said coating of resinous material on the surface of said paper to a thin continuous highly glossed surface, and continuously stripping the resulting hot glossed paper from said heated highly polished roll surface while said paper is at the temperature to which it is heated in said glossing step.

2. A continuous process of glossing paper with a thermoplastic resinous copolymer of styrene and acrylonitrile wherein the relative proportions of the styrene and acrylonitrile range from 65 to 80 per cent by weight of styrene and correspondingly from 35 to 20 per cent by weight of acrylonitrile which comprises applying a coating of an aqueous dispersion of said copolymer on the surface of the paper, drying the coated paper at a temperature which is from 20° C. to 60° C. higher than the second order transition temperature of said copolymer and thereby removing the water from the coating and causing said copolymer to adhere to the surface of the paper in the form of small particles constituting a discontinuous film in preparation for the subsequent glossing step, continuously glossing the coating of said copolymer on the surface of the paper by subjecting the dried coated paper to a continuous even-speed calendering operation in which the coated surface of the paper is pressed continuously against a heated highly polished roll surface which is at a temperature from 40° C. to 80° C. higher than the second order transition temperature of said copolymer and thereby converting said coating of copolymer on the surface of said paper to a thin continuous highly glossed surface, and continuously stripping the resulting hot glossed paper from said heated highly polished roll surface while said paper is at the temperature to which it is heated in said glossing step.

WILLIAM W. COWGILL.

REFERENCES CITED

The following references are of record in the file of this patent:

UNITED STATES PATENTS

| Number | Name | Date |
|---|---|---|
| 2,416,232 | Soday | Feb. 18, 1947 |
| 2,431,745 | Flanagan | Dec. 2, 1947 |
| 2,441,523 | Ward | May 11, 1948 |

OTHER REFERENCES

Ser. No. 397,138, Fikentscher (A. P. C.), published May 11, 1943.